US012767457B2

(12) United States Patent
Graston et al.

(10) Patent No.: US 12,767,457 B2
(45) Date of Patent: Oct. 20, 2026

(54) SYSTEM AND METHOD FOR TRANSFERRING PARCELS

(71) Applicant: Material Handling Systems, Inc., Mt. Washington, KY (US)

(72) Inventors: Carl David Graston, Sellersburg, IN (US); Madhav Devidas Patil, Louisville, KY (US); Paul Receveur, New Albany, IN (US); Michael Schindler, Louisville, KY (US)

(73) Assignee: FORTNA Systems, Inc., Mt. Washington (KY)

( * ) Notice: Subject to any disclaimer, the term of this patent is extended or adjusted under 35 U.S.C. 154(b) by 643 days.

(21) Appl. No.: 18/115,263

(22) Filed: Feb. 28, 2023

(65) Prior Publication Data

US 2023/0271791 A1 Aug. 31, 2023

Related U.S. Application Data

(60) Provisional application No. 63/314,675, filed on Feb. 28, 2022.

(51) Int. Cl.
*B65G 47/52* (2006.01)
*B07C 5/36* (2006.01)
(Continued)

(52) U.S. Cl.
CPC ................ *B65G 47/52* (2013.01); *B07C 5/36* (2013.01); *B25J 9/0093* (2013.01); *B65G 43/08* (2013.01);
(Continued)

(58) Field of Classification Search
CPC ........ B65G 47/52; B65G 47/44; B65G 47/49; B65G 47/90; B65G 2203/0216;
(Continued)

(56) References Cited

U.S. PATENT DOCUMENTS 6,264,042 B1 * 7/2001 Cossey, Jr. .............. B07C 5/362 198/572
10,646,898 B2 5/2020 Hillerich, Jr. et al.
(Continued)

FOREIGN PATENT DOCUMENTS

JP 2015-206597 A 11/2015
KR 10-2225450 B1 3/2021

OTHER PUBLICATIONS

Korean Intellectual Property Office, International Search Report and Written Opinion issued in corresponding Application No. PCT/US2023/014052, mailed Jun. 8, 2023.
(Continued)

*Primary Examiner* — Thomas Randazzo
(74) *Attorney, Agent, or Firm* — Stites & Harbison, PLLC; David W. Nagle, Jr.; Gary N. Stewart

(57) ABSTRACT

A system for transferring parcels made in accordance with the present invention includes: a first conveyor for conveying a bulk flow of parcels; a second conveyor positioned adjacent to the first conveyor; a robot positioned adjacent to the first conveyor and the second conveyor; and a rejection member. The robot engages and transfers select parcels in the bulk flow of parcels on the first conveyor to the second conveyor. The rejection member is positioned as to receive parcels offloaded from the first conveyor and/or the second conveyor and directs such parcels out of the system. Parcels within the bulk flow of parcels with characteristics which make it difficult for one or more of the components of the system or downstream systems to handle or process can be directed to the rejection member by operation of the first conveyor and/or the second conveyor to reduce system processing delays and stoppages.

19 Claims, 4 Drawing Sheets

(51) Int. Cl.

| | |
|---|---|
| ***B25J 9/00*** | (2006.01) |
| ***B65G 43/08*** | (2006.01) |
| ***B65G 47/44*** | (2006.01) |
| ***B65G 47/49*** | (2006.01) |
| ***B65G 47/90*** | (2006.01) |

(52) U.S. Cl.
CPC ............. *B65G 47/44* (2013.01); *B65G 47/49* (2013.01); *B65G 47/90* (2013.01); *B07C 2501/0063* (2013.01); *B65G 2203/0216* (2013.01); *B65G 2203/0258* (2013.01); *B65G 2203/041* (2013.01)

(58) Field of Classification Search
CPC ...... B65G 2203/0258; B65G 2203/041; B65G 47/256; B65G 47/32; B65G 61/00; B65G 43/08; B07C 2501/0063; B07C 5/36; B25J 9/0093
See application file for complete search history.

(56) References Cited

U.S. PATENT DOCUMENTS

| | | | | |
|---|---|---|---|---|
| 10,994,309 | B2 | 5/2021 | Hillerich, Jr. et al. | |
| 11,130,634 | B1 * | 9/2021 | Berg | B65G 11/203 |
| 11,524,403 | B2 | 12/2022 | Douglas et al. | |
| 2018/0345324 | A1 * | 12/2018 | Hillerich, Jr. | B07C 5/3422 |
| 2020/0189861 | A1 | 6/2020 | Kleczewski | |
| 2020/0377309 | A1 * | 12/2020 | Douglas | B65G 47/917 |
| 2021/0221002 | A1 | 7/2021 | Bader et al. | |
| 2021/0308722 | A1 * | 10/2021 | Hillerich, Jr. | G06V 20/64 |
| 2021/0395023 | A1 | 12/2021 | Patil et al. | |

OTHER PUBLICATIONS

European Patent Office, Supplementary European Search Report issued in corresponding Application No. EP 23760770 dated Dec. 5, 2025.

* cited by examiner

SYSTEM AND METHOD FOR TRANSFERRING PARCELS

CROSS-REFERENCE TO RELATED APPLICATION

The present application claims priority to U.S. Patent Application Ser. No. 63/314,675 filed on Feb. 28, 2022, the entire disclosure of which is incorporated herein by reference.

BACKGROUND OF THE INVENTION

In a sorting facility for parcels, parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility.

When first introduced into the system of conveyors and equipment, the parcels are randomly positioned on a conveyor in a "bulk flow." Thus, within the sorting facility, the first step is often to transform the bulk flow into a singulated flow of parcels in which the parcels are positioned at substantially equal intervals and aligned (i.e., in a single file line) along a conveyor for subsequent processing. A wide variety of singulators exist in the art, many of which employ various combinations of belt conveyors and/or roller conveyors to achieve the desired singulation of the parcels.

For example, commonly assigned U.S. Pat. Nos. 10,646,898 and 10,994,309, which are incorporated herein by reference, describe a system and method for identifying and transferring parcels from a bulk flow of parcels on the first conveyor (or "pick conveyor") to a singulated stream of parcels on the second conveyor (or "place conveyor"). Specifically, a robot singulator (or robot) receives parcels via the pick conveyor, engages each parcel, and then places it onto the place conveyor. A vision and control subsystem communicates instructions to control operation of the robot.

For another example, commonly assigned U.S. Patent Application Publication No. 2021/0395023, which is also incorporated herein by reference, describes another method and system for transferring parcels from a bulk flow into a singulated stream of parcels. An exemplary conveyor includes: a pick conveyor defining a picking area for a bulk flow of parcels; a place conveyor positioned downstream of the picking area; a first robot singulator (or first robot) and a second robot singulator (or second robot), which work in parallel to transfer parcels within the picking area into a singulated stream on the place conveyor; and a vision and control subsystem that is operably connected to the first robot and the second robot, such that the vision and control subsystem can communicate instructions to control operation of such components.

In any of the above-described conveyor systems, for various reasons, the robots may not be able to engage certain parcels. For example, certain parcels may exceed certain size limitations and/or weight limitations of the robots, be broken or damaged, or possess other characteristics which inhibit the transfer of such parcels from one conveyor to another and characterized as "unconveyable." In other cases, the vision and control subsystem may not be able to accurately identify a parcel because of a "hidden" edge or other anomaly that makes it difficult to identify the parcel.

Furthermore, in some instances, parcels successfully identified by the vision and control subsystem and transferred from the first conveyor to the second conveyor by a robot may still nonetheless be unsuitable for subsequent downstream processing. For example, certain parcels transferred by the robot may exceed size and/or weight limitations of the conveyor onto which such parcels are deposited and/or conveyors or other parcel sorting or processing devices located downstream thereof. In this regard, such parcels may also be characterized as "unconveyable."

Accordingly, there is a need for systems and methods to handle those parcels which cannot be readily transferred from the first conveyor to the second conveyor by a robot and/or which are unsuitable for processing subsequent to being transferred to the second conveyor.

SUMMARY OF THE INVENTION

The present invention is a system for transferring parcels, and, more specifically, a system for transferring parcels within a bulk flow of parcels from a first conveyor to a second conveyor while also directing unconveyable parcels within the bulk flow out of the system.

An exemplary system for transferring parcels made in accordance with the present invention includes: a first conveyor for conveying a bulk flow of parcels; a second conveyor positioned adjacent to the first conveyor; a robot positioned adjacent to the first conveyor and the second conveyor; and a rejection member. The robot is configured to engage and transfer select parcels in the bulk flow of parcels on the first conveyor from the first conveyor to the second conveyor. The rejection member is configured to receive select parcels and direct such parcels out of the system. The rejection member is positioned relative to the first conveyor and the second conveyor, such that parcels offloaded from at least one of the first conveyor and the second conveyor are received by the rejection member. Parcels within the bulk flow with characteristics which make it difficult for one or more of the components of the system or downstream systems to handle or process can be directed to the rejection member by operation of the first conveyor and/or the second conveyor to reduce system processing delays and stoppages, thus improving the overall parcel throughput of the system.

In some embodiments, the system further includes a vision and control subsystem which includes a camera for acquiring image data of the bulk flow of parcels and a controller that is operably connected to the camera and the robot. The controller is configured to receive and process the image data and to selectively communicate instructions to cause the robot to engage and transfer select parcels in the bulk flow of parcels from the first conveyor to the second conveyor. In some embodiments, the controller is also operably connected to the first conveyor and can selectively communicate instructions to selectively activate the first conveyor to offload one or more parcels within the bulk flow of parcels to the rejection member. In some embodiments, the rejection member is positioned adjacent to a distal end of the first conveyor, such that parcels offloaded from the distal end of the first conveyor are received by the rejection member.

In some embodiments, the system further includes a second rejection member configured to direct parcels out of the system. In one such embodiment, the second conveyor is a bidirectional conveyor and the second rejection member is positioned adjacent to a proximal end of the second conveyor, such that parcels offloaded from the proximal end of the second conveyor are directed to and received by the second rejection member.

In some embodiments, the second conveyor includes a module configured to convey parcels transferred to the second conveyor along a longitudinal axis of the second conveyor and to be selectively activated to convey select parcels transferred to the second conveyor in a transverse direction relative to the longitudinal axis of the second conveyor. In one such embodiment, the rejection member is positioned adjacent to the second conveyor, such that parcels offloaded from the second conveyor in the transverse direction are received by the rejection member. In another such embodiment, the system further includes a third conveyor which is positioned adjacent to the module of the second conveyor and is configured to be selectively activated to convey parcels received from the second conveyor to the module. In some embodiments, the third conveyor may include a scale for weighing parcels transferred to the third conveyor.

In some embodiments, the vision and control subsystem is operably connected to the second conveyor, such that the controller can communicate instructions to affect the operation of the second conveyor. In some embodiments, the vision and control subsystem is operably connected to the third conveyor, such that the controller can communicate instructions to affect the operation of the third conveyor.

In some embodiments, the rejection member is a chute that defines at least one of an inclined plane along which parcels offloaded to the rejection member can slide and an opening through which parcels offloaded to the rejection member can fall through.

DETAILED DESCRIPTION OF THE INVENTION

The present invention is a system for transferring parcels, and, more specifically, a system for transferring parcels within a bulk flow of parcels from a first conveyor to a second conveyor while also directing unconveyable parcels within the bulk flow out of the system.

Figure 1:
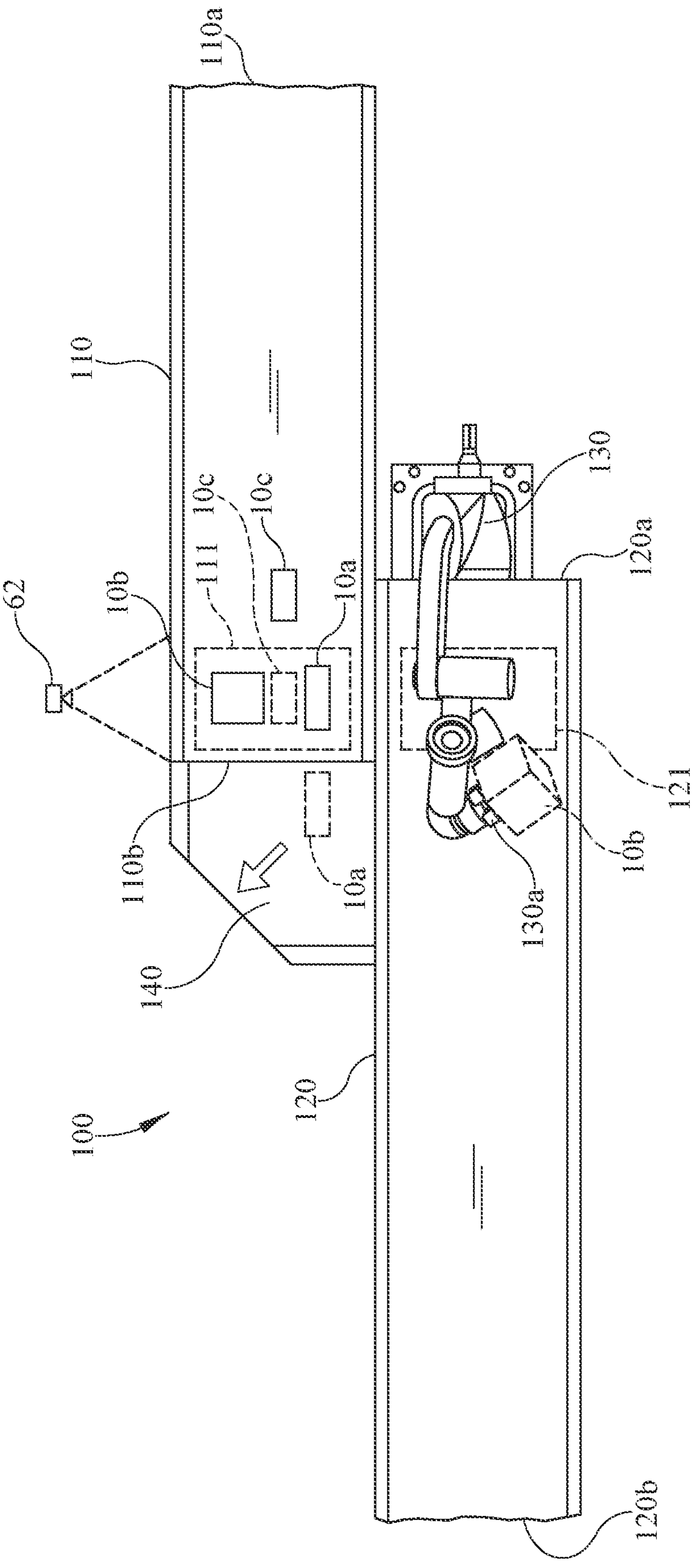
FIG. 1 is a schematic view of an exemplary system for transferring parcels made in accordance with the present invention.

FIG. 1 is a schematic view of an exemplary system 100 for transferring parcels made in accordance with the present invention. In FIG. 1, parcels 10*a*, 10*b*, 10*c* illustrated in solid lines represent such parcels at a first time, and parcels 10*a*, 10*b*, 10*c* illustrated in broken lines represent such parcels at a second (later) time. In this regard, it is important to recognize that, in the discussion that follows and in the claims of the present application, the term "parcel" is not intended to be limiting and can include any article, item, or object that may be received and processed by the exemplary system 100 illustrated in in FIG. 1 and/or the exemplary systems 200, 300 illustrated in FIGS. 2 and 3.

As shown in FIG. 1, the system 100 includes: a first conveyor 110 for conveying a bulk flow of parcels; a second conveyor 120 positioned adjacent to the first conveyor 110; a robot 130 positioned adjacent to the first conveyor 110 and the second conveyor 120; and a rejection member 140. While the system 100 is in use, the robot 130 engages and transfers select parcels in the bulk flow of parcels from the first conveyor 110 to the second conveyor 120 to further convey the transferred parcels toward an intended destination. As parcels are engaged (or "picked") at the first conveyor 110 and deposited (or "placed") on the second conveyor 120, the first conveyor 110 and the second conveyor 120 may also be characterized as a "pick conveyor" and a "place conveyor," respectively. To reduce system processing delays and stoppages and improve overall parcel throughput, parcels with characteristics that make it difficult for the robot 130 to readily engage and transfer such parcels to the place conveyor 120 are identified as "unconveyable" and are directed to the rejection member 140, which directs the unconveyable parcels out of the system 100 for subsequent processing, so that the remaining parcels on the pick conveyor 110 can be efficiently transferred by the robot 130 and conveyed by the place conveyor 120. In this exemplary embodiment, the system 100 further includes a vision and control subsystem 50 (FIG. 4) which is configured to identify unconveyable parcels within the bulk flow of parcels on the pick conveyor 110 and regulate operation of the robot 130. As further discussed below with reference to FIG. 4, in some embodiments, the vision and control subsystem 50 may also serve to regulate operation of the pick conveyor 110 and additional components of the other exemplary systems 200, 300 described herein with reference to FIGS. 2 and 3.

As will become evident in the discussion which follows, it should also be appreciated that the characteristics of a parcel which, if present, render the parcel as "unconveyable" may vary depending on the particular sorting application for which the system is being utilized and/or capacity of system components (e.g., load capacity of the pick conveyor, load capacity of the place conveyor, and/or carrying capacity of the robot 130). As such, it should be recognized that, in the discussion that follows and in the claims of the present application, the term "unconveyable parcel" is not necessarily limited to parcels which cannot be readily transferred by the robot 130 of the exemplary systems 100, 200, 300 described herein, but, rather, may be any parcel exhibiting characteristics which, according to predefined characteristics programmed into the vision and control subsystem 50 (FIG. 4) are (i) likely to disrupt operation of one or more components of the exemplary systems 100, 200, 300 described herein or additional parcel sortation or processing systems located downstream of, and fed parcels by, the exemplary systems described herein and/or (ii) otherwise render the expulsion of the parcel exhibiting such characteristics from the exemplary systems 100, 200, 300 described herein desirable.

Referring now again to FIG. 1, the pick conveyor 110 is configured to receive and convey a bulk flow of parcels loaded thereon toward a distal end 110*b* of the pick conveyor 110. In this regard, and in some implementations, the pick conveyor 110 may be positioned downstream of an upstream conveyor, such that parcels offloaded from the upstream conveyor are directed onto a proximal end 110*a*. In this exemplary embodiment, the pick conveyor 110 is configured to be selectively activated and deactivated (or "indexed") by the vision and control subsystem 50 to advance parcels loaded thereon toward the distal end 110*b* of the pick conveyor 110, as further described below with reference to FIG. 4.

Referring still to FIG. 1, the place conveyor 120 is positioned adjacent to the pick conveyor 110. Specifically, in this exemplary embodiment, the place conveyor 120 is positioned in side-by-side relationship with the pick conveyor 110, such that the place conveyor 120 abuts the pick conveyor 110, the importance of which is further described below. In this exemplary embodiment, the place conveyor 120 is continuously driven. Alternative embodiments are, however, contemplated in which the place conveyor 120 is also operably connected to and indexed by the vision and control subsystem 50 (FIG. 4), such that the place conveyor 120 can be selectively activated and deactivated by the vision and control subsystem 50.

Referring still to FIG. 1, in this exemplary embodiment, the pick conveyor 110 and the place conveyor 120 are each a motor-driven, continuous belt conveyor. Of course, motorized conveyors of different types and construction suitable for carrying out the operations of the pick conveyor 110 and/or the place conveyor 120 may alternatively be utilized as the pick conveyor 110 and/or the place conveyor 120, respectively, without departing from the spirit and scope of the present invention.

Referring still to FIG. 1, as noted above, the robot 130 is configured to engage and transfer parcels from the pick conveyor 110 to the place conveyor 120. As such, the robot 130 is positioned adjacent to the pick conveyor 110 and the place conveyor 120, so that parcels located in a pick area 111 located proximate to the distal end 110*b* of the pick conveyor 110 can be engaged and transferred to a place area 121 located proximate to a proximal end 120*a* of the place conveyor 120. In this exemplary embodiment, the robot 130 is mounted to a pedestal (not shown) located adjacent to the proximal end 120*a* of the place conveyor. Of course, the robot 130 may be alternatively positioned and/or mounted in a manner which enables the robot 130 to engage and transfer parcels from the pick area 111 to the place area 121 without departing from the spirit or scope of the present invention. For instance, in some embodiments, the robot 130 may be mounted to a framework in proximity to the pick conveyor 110 and the place conveyor 120 or to the pick conveyor 110 and/or place conveyor 120 in an upright or inverted position. In this exemplary embodiment, the robot 130 is a six-axis articulating robotic arm, such as the M-10iD/12 robot manufactured by and available from FANUC America of Rochester Hills, Michigan. It is appreciated, however, that alternative robots configured to engage and transfer parcels in the manner described herein can alternatively be utilized for the robot 130 without departing from the spirit and scope of the present invention. As shown, the robot 130 includes an end effector 130*a* that is configured to engage and maintain a parcel in association with the robot 130 during transfer from the pick conveyor 110 to the place conveyor 120. For example, the end effector 130*a* of the robot may include one or more vacuum cups in fluid communication with a vacuum source and configured to be engaged with a parcel. In this regard, suitable end effectors which may be utilized as the end effector 130*a* of the robot include, but are not limited to those described in commonly assigned U.S. Pat. No. 11,524,403 and U.S. Patent Publication No. 2021/0221002, each of which is incorporated herein by reference.

As further described below in connection with the exemplary systems 200, 300 of FIGS. 2 and 3, in some exemplary embodiments, the robot 230 also includes a sensor 232 configured to obtain readings corresponding to the weight of a parcel carried by the robot 230.

Referring still to FIG. 1, in transferring parcels from the pick conveyor 110 to the place conveyor 120, the robot 130 follows the same general movement cycle, which, in this case, includes three movements: a first movement from a predetermined initial (or "home") position to a target parcel on the pick conveyor 110 to initiate transfer of the target parcel; a second movement from the point of engagement with the target parcel to a position above the place conveyor 120 to deliver the target parcel; and a third movement from the position above the place conveyor 120 back to the home position. As a result of the pick conveyor 110 and the place conveyor 120 being in side-by-side relationship and abutting each other, the distance which the robot 130 must travel during the second movement is minimized, thus increasing the number of parcels which can be transferred by the robot 130, and thus the overall throughput of the system 100, as a whole, during a predetermined period of time.

Referring still to FIG. 1, in this exemplary embodiment, the rejection member 140 is positioned adjacent to and abuts the distal end 110*b* of the pick conveyor 110, such that parcels offloaded from the pick conveyor 110 are directed onto the rejection member 140. The rejection member 140 is configured to direct parcels out of the system 100 and, in this exemplary embodiment, is a chute that defines an inclined plane along which parcels received from the pick conveyor 110 slide as they are directed out of the system 100, as evidenced by the movement of parcel 10*a* and the associated arrow in FIG. 1. Ordinarily, a bin or an additional conveyor will be positioned downstream of the rejection member 140 for collecting or redirecting, respectively, parcels directed out of the system 100 to an intended destination.

Figure 4:
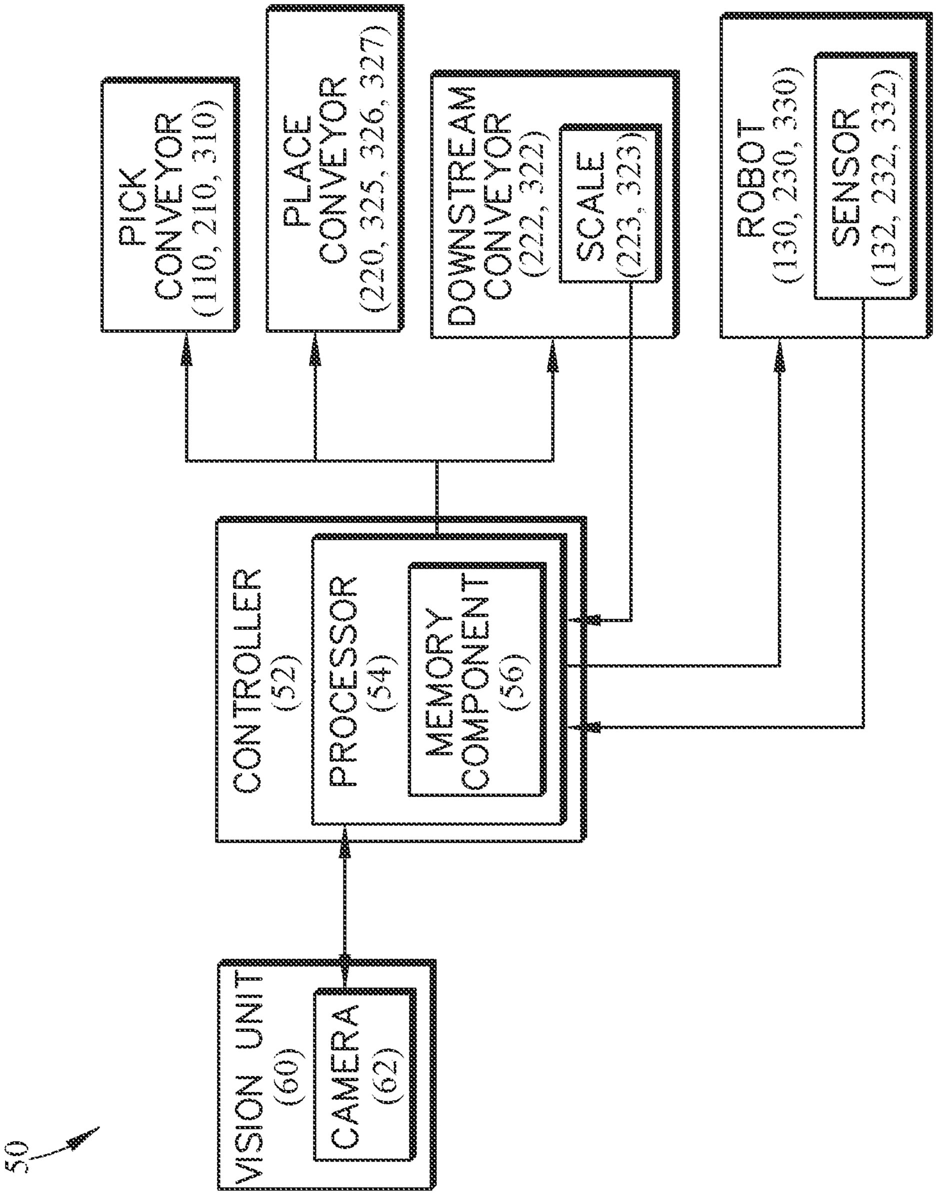
FIG. 4 is a schematic diagram of a vision and control subsystem for use in the systems of FIGS. 1-3.

FIG. 4 is a schematic diagram of an exemplary vision and control subsystem 50 for use in the exemplary systems described herein.

Referring now to FIGS. 1 and 4, the vision and control subsystem 50 generally includes a controller 52 and a vision unit 60 that is operably connected to the controller 52, such that the controller 52 can communicate instructions to, and receive data from, the vision unit 60. The vision unit 60 includes a camera 62 that is positioned (e.g., by virtue of being mounted to the pick conveyor 110, the place conveyor 120, the robot 130, or rejection member 140 or a framework (not shown) in proximity to the system 100), so that the pick area 111 is within the field of view of the camera 62. The camera is configured to acquire two-dimensional and/or three-dimensional images of the pick area 111. Suitable cameras which may be utilized as the camera 62 of the vision unit 60 include the image sensors manufactured and distributed by ifm Effector Inc. of Malvern, Pennsylvania. In this exemplary embodiment, the camera 62 is configured to obtain images substantially continuously. Alternative embodiments are contemplated, however, in which the camera 62 is selectively activated to obtain images of the pick area 111 in response to instructions (or signals) communicated from the controller 52. Although the camera 62 is generally referred to herein and illustrated within the drawings as including only a single camera, embodiments in which the camera 62 comprises multiple cameras are also contemplated herein.

Referring now specifically to FIG. 4, in this exemplary embodiment, images of the pick area 111 acquired by the camera 62 are transmitted to the controller 52 as image data for subsequent processing. In alternative embodiments, the images acquired by the camera 62 may be processed locally at the vision unit 60, with the processed images then transmitted to the controller 52 as image data for subsequent processing. In such embodiments, the vision unit 60 will typically further include a processor (not shown) configured to execute instructions (routines) stored in a memory component (not shown) or other computer-readable medium to process the images acquired by the camera 62. Suitable processors for use in the vision unit 60 in such embodiments include that provided within the Jetson Nano computer manufactured and distributed by Nvidia Corporation of Santa Clara, California. Of course, other processors suitable for locally processing the images acquired by the camera 62 may also be used.

Referring still to FIG. 4, the controller 52 includes a processor 54 configured to execute instructions stored in a memory component 56 or other computer-readable medium to perform the various operations of the controller 52 described herein. In this exemplary embodiment, the controller 52 is a programmable logic controller or other industrial controller. The controller 52 is connected to the vision unit 60 to facilitate the transmission of data from the vision unit 60 to the controller 52 to the vision unit 60 either by wired connection (e.g., Ethernet connection) or by wireless connection (e.g., via a network) using known interfaces and protocols.

Referring still to FIG. 4, in this exemplary embodiment, the controller 52 is also operably connected to the pick conveyor 110, such that the controller 52 can communicate instructions (signals) which cause the pick conveyor 110 to index and advance parcels loaded on the pick conveyor 110 toward a distal end 110*b* of the pick conveyor 110. In this exemplary embodiment, the controller 52 is also operably connected to the robot 130, such that the controller 52 can communicate instructions which cause the robot 130 to engage and transfer parcels within the pick area 111 of the pick conveyor 110 to the place area 121 of the place conveyor 120.

Referring now again to FIGS. 1 and 4, when the system 100 is in use, the controller 52 receives and processes image data received from the vision unit 60 to determine whether one or more parcels 10*a*, 10*b* are located in the pick area 111. Upon detecting the presence of a parcel within the pick area 111, the controller 52 further processes the image data to identify which of the parcels 10*a*, 10*b*, if any, are unconveyable and should be directed to the rejection member 140. In this regard, the controller 52 processes the image data from the vision unit 60 to examine each parcel 10*a*, 10*b* within the pick area 111 and determine whether the parcel exhibits one or more predefined characteristics which signify that the parcel is unconveyable. In this exemplary implementation, the dimensions of each parcel within the pick area 111 of the pick conveyor 110 are assessed based on the image data received from the vision unit 60 to determine whether the parcel should be identified as unconveyable. Specifically, during such assessment the width, height, and/or depth of each parcel is assessed to determine whether such dimension(s) exceed a predefined maximum threshold and/or fall below a predefined minimum threshold. Those parcels with dimensions exceeding the maximum threshold and/or falling below the minimum threshold are identified as being unconveyable by the controller 52.

Referring still to FIGS. 1 and 4, for each parcel in the pick area 111 not identified as unconveyable, the controller 52 communicates instructions which cause the robot 130 to engage and transfer the parcel to the place area 121, as evidenced by parcel 10*b* in FIG. 1. In this exemplary embodiment, the place conveyor 120 is a continuously driven conveyor, such that parcels deposited by the robot 130 are immediately conveyed toward the distal end 120*b* of the place conveyor 120. Once all parcels within the pick area 111 not identified as unconveyable have been removed from the pick area 111 by the robot 130, i.e., either no parcels remain or only unconveyable parcels remain in the pick area 111, the controller 52 communicates instructions which cause the pick conveyor 110 to index until a new parcel, such as parcel 10*c* in FIG. 1, is identified within the pick area 111. In instances where one or more unconveyable parcels were located in the pick area 111 prior to such indexing, the unconveyable parcels will, after such indexing, be further conveyed toward the distal end 110*b* of the first conveyor 110, and, in some cases, depending on the spacing between such parcels and the parcel newly entering the pick area 111, may be directed onto the rejection member 140, as evidenced by parcel 10*a* in FIG. 1. The above-described routine can be repeated until all parcels on the pick conveyor 110 have been either transferred to the place conveyor 120 or directed out of the system 100 by the rejection member 140.

Although the pick conveyor 110 of the exemplary system 100 of FIG. 1 is primarily described herein in the context of being indexed to advance parcels along the pick conveyor 110 and direct unconveyable parcels to the rejection member 140, embodiments and implementations in which the pick conveyor 110 is continuously driven are also contemplated herein. For instance, in some sorting applications it may be beneficial to simply transfer as many parcels within a bulk flow of parcels on the pick conveyor 110 to the place conveyor 120 in a given time without regard for characteristics of the individual parcels within the bulk flow on the pick conveyor 110. To accommodate such applications, embodiments and implementations are contemplated herein in which a bulk flow of parcels loaded onto the pick conveyor 110 is continuously conveyed toward a distal end of the pick conveyor 110, and the robot 130 is configured to indiscriminately engage and transfer parcels (i.e., without regard to the characteristics of the parcels) within the bulk flow to the place conveyor 120. Those parcels which are not engaged by the robot 130 prior to reaching the distal end of the pick conveyor 110 are directed onto the rejection member 140. An additional conveyor or system of conveyors positioned downstream of the rejection member 140 may be configured to redirect parcels not engaged and transferred by the robot 130 on the first pass back to the pick conveyor 110, such that each parcel initially loaded onto the pick conveyor 110 is recirculated until successfully transferred by the robot 130. In such embodiments and implementations, the robot 130 may be provided with an onboard parcel detection mechanism or system which enables the robot 130 to independently identify and locate parcels on the pick conveyor 110 without use of the vision and control subsystem 50. Accordingly, alternative embodiments and implementation are also contemplated herein in which the system 100 includes only the pick conveyor 110, the place conveyor 120, the robot 130, and the rejection member 140.

Figure 2:
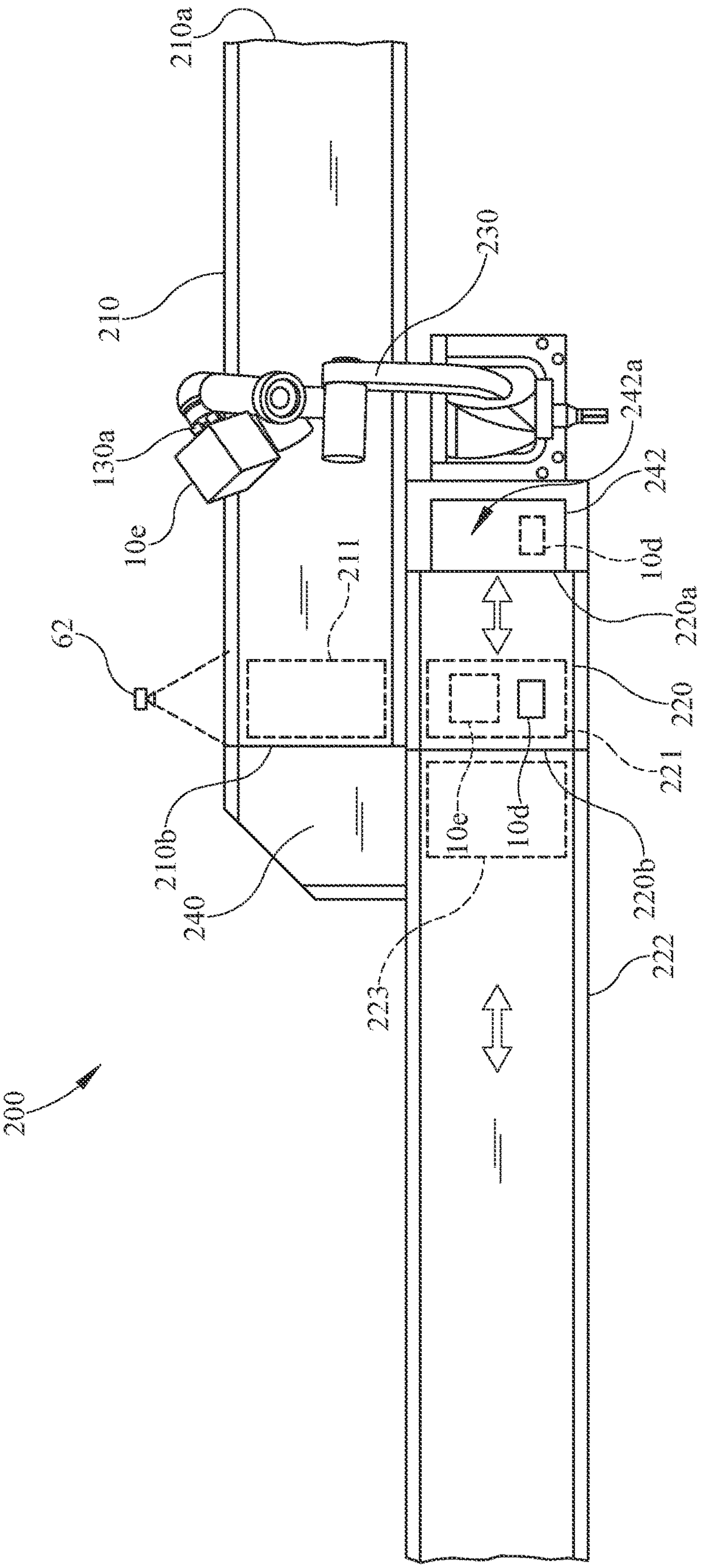
FIG. 2 is a schematic view of another exemplary system for transferring parcels made in accordance with the present invention.

FIG. 2 is a schematic view of another exemplary system 200 for transferring parcels made in accordance with the present invention. In FIG. 2, parcels 10*d*, 10*e* illustrated in solid lines represent such parcels at a first time, and parcels 10*d*, 10*e* illustrated in broken lines represent such parcels at a second (later) time.

Referring now to FIGS. 2 and 4, in this exemplary embodiment, the system 200 includes a pick conveyor 210, a robot 230, and a first rejection member 240 that are identical to the pick conveyor 110, the robot 130, and the rejection member 140, respectively, of the system 100 described above with reference to FIG. 1. Unlike the system 100 described above with reference to FIG. 1, however, in this exemplary embodiment, the place conveyor 220 is a bidirectional conveyor that can be driven in two different directions to advance parcels forward or move parcels rearward, the importance of which is further described below. Further, unlike the system 100 described above with reference to FIG. 1, in this exemplary embodiment, the system 200 further includes: a second rejection member 242 which receives parcels offloaded from a proximal end 220*a* of the place conveyor 220 and directs such parcels out of the system 200; and a downstream conveyor 222 which receives parcels offloaded from a distal end 220*b* of the place conveyor 220.

Referring still to FIGS. 2 and 4, the place conveyor 220 is positioned adjacent to the pick conveyor 210. Specifically, the place conveyor 220 is positioned in side-by-side relationship with the pick conveyor 210, such that the place conveyor 220 abuts the pick conveyor 210 to limit the movement required of the robot 230 as it transfers parcels from a pick area 211 of the pick conveyor 210 to a place area 221 the place conveyor 220 and improve the overall throughput of the system 200 in the same manner as the system 100 described above with reference to FIG. 1. In this exemplary embodiment, the place conveyor 220 is operably connected to the vision and control subsystem 50 (FIG. 4), such that the controller 52 can communicate instructions to selectively index the place conveyor 220 to advance parcels loaded thereon in either a forward direction toward the downstream conveyor 222 or a rearward direction toward the second rejection member 242. In this exemplary embodiment, the place conveyor 220 is a motor-driven, continuous belt conveyor. Of course, motorized conveyors of different types and construction suitable for carrying out the operations of the place conveyor 220 may alternatively be utilized without departing from the spirit and scope of the present invention.

Referring now specifically to FIG. 2, in this exemplary embodiment, the second rejection member 242 is positioned adjacent to a proximal end 220*a* of the place conveyor 220, such that parcels offloaded from the proximal end 220*a* of the place conveyor 220 as a result of the place conveyor 220 being indexed in the rearward direction are directed to the second rejection member 242. As noted above, like the first rejection member 240, the second rejection member 242 is also configured to direct parcels out of the system 200. Accordingly, in this exemplary embodiment, parcels can be rejected for subsequent processing in two different ways. That is, if parcels on the pick conveyor 221 are identified as being unconveyable as a result of such parcels exhibiting one or more characteristics which signify such parcels cannot be successfully transferred by the robot 130, those parcels can be advanced forward onto the first rejection member 240 by indexing the pick conveyor 110 in the same manner as described above for the system 100 of FIG. 1. Unlike the system 100 of FIG. 1, however, parcels which are successfully engaged and transferred by the robot 230 can still be identified as being unconveyable by the vision and control subsystem 50 (FIG. 4) (e.g., the parcel is too heavy) and directed out of the system 200 for subsequent processing via the second rejection member 242, as further described below.

Referring still to FIG. 2, in this exemplary embodiment, the second rejection member 242 is also a rejection chute. However, unlike the chute defining the first rejection member 240, in this exemplary embodiment, the chute defining the second rejection member 242 defines an opening 242*a* through which parcels offloaded from the proximal end 220*a* of the place conveyor 220 fall through to be directed out of the system 200. In some implementations, parcels directed out of the system 200 by the second rejection member 242 may be directed to a bin or a conveyor positioned downstream of the second rejection member 242.

Although not shown, in some embodiments, the rejection chute defining the second rejection member 242 may include one or more doors that can be selectively opened and closed via an actuator to provide access to the opening 242*a*. One such rejection chute is disclosed in commonly assigned U.S. Pat. No. 11,130,634, which is incorporated herein in its entirety by reference. In embodiments employing such a rejection chute, it is generally preferred that the actuator of the rejection chute be operably connected to the vision and control subsystem 50 (FIG. 4), such that the controller 52 can selectively communicate instructions (e.g., based on image data received from the vision unit 60) which cause the actuator to transition the one or more doors of the rejection chute between the open and closed position.

It should be appreciated, however, that the system 200 is not necessarily limited to the rejection chute arrangement illustrated in FIG. 2. In this regard, alternative embodiments, in which the first rejection member 240 and the second rejection member 242 are both rejection chutes of the same type are also contemplated herein. For instance, in one embodiment, both the first rejection member 240 and the second rejection member 242 may both be a rejection chute defining an inclined plane for unconveyable parcels to slide along as they are directed out of the system 200, while, in another embodiment, both the first rejection member 240 and the second rejection member 242 may both be a rejection chute defining an opening through which unconveyable parcels fall through as they are directed out of the system 200.

Referring now again to FIGS. 2 and 4, in this exemplary embodiment, the downstream conveyor 222 is a bidirectional conveyor that can be driven in two different directions to advance parcels forward or move parcels rearward. In this regard, like the place conveyor 220, the downstream conveyor 222 is also operably connected to the vision and control subsystem 50 (FIG. 4), such that the controller 52 can communicate instructions to index the downstream conveyor 222 to move parcels loaded thereon in either a forward direction further downstream toward a distal end of the downstream conveyor 222 or a rearward direction toward the place conveyor 220. In this exemplary embodiment, the downstream conveyor 222 is a motor-driven conveyor which includes an integrated scale 223 for measuring the weight of the parcels received on a proximal end of the downstream conveyor 222. The scale 223 is operably connected to the vision and control subsystem 50, such that weight readings from the scale 223 are transmitted to the controller 52 for further processing. In this exemplary embodiment, the downstream conveyor 222 is a continuous belt conveyor. Of course, motorized conveyors of different types and construction suitable for carrying out the operations of the downstream conveyor 222 described herein may alternatively be utilized without departing from the spirit and scope of the present invention.

Referring still to FIGS. 2 and 4, when the system 200 is in use, parcels on the pick conveyor 110 are initially processed in the same manner as the system 100 described above with reference to FIG. 1. That is, parcels which are not identified as unconveyable based on the image data received by the controller 52 from the camera 62 are engaged and transferred by the robot 230 to the place conveyor 220, while parcels identified by the vision and control subsystem 50 as unconveyable are directed to the first rejection member 240, so that such parcels can be directed out of the system 200 for subsequent processing. Unlike with the system 100 described above with reference to FIG. 1, however, the vision and control subsystem 50 conducts a secondary assessment of each parcel transferred to the place conveyor 220 to determine whether the parcel should be identified as unconveyable and directed to the second rejection member 242, so that the parcel can be directed out of the system 200 for subsequent processing. In this exemplary implementation, such secondary assessment is based on the weight. In this regard, the weight of each parcel transferred to the place area 221 of the place conveyor 220 is assessed to determine whether the weight of the parcel exceeds a predefined maximum threshold and/or falls below a predefined minimum threshold. Those parcels with weights which exceed the maximum threshold or fall below the minimum threshold are identified by the controller 52 as unconveyable.

Referring still to FIGS. 2 and 4, in this exemplary embodiment, the robot 230 further includes a sensor 232, such as a load cell or strain gauge, which is configured to obtain readings that are indicative of the weight of a parcel as it is being transferred by the robot 230 to the place conveyor 220. The sensor 232 is operably connected to the vision and control subsystem 50, such that readings obtained by the sensor 232 are transmitted to the controller 52 for subsequent processing. As the parcel is transferred to the place conveyor 220 by the robot 230, the readings obtained by the sensor 232 are processed by the controller 52 to determine whether the parcel should be identified as unconveyable and directed to the second rejection member 242 at the time or soon after the parcel being deposited in the place area 221. If the readings obtained from the sensor 232 reflects that the parcel is above the maximum weight threshold or below the minimum weight threshold, the controller 52 communicates instructions which cause the place conveyor 220 to be driven in a rearward direction for a predetermined time, so that the parcel is directed to the second rejection member 242 after being deposited onto the place conveyor 220, as evidenced by the progression of parcel 10*d* in FIG. 2. Once a parcel exceeding the maximum weight threshold or falling below the minimum weight threshold is offloaded from the place conveyor 220 into the second rejection member 242, another parcel can be delivered to the place conveyor 220 by the robot 230, as evidenced by the progression of parcel 10*e* in FIG. 2. Conversely, if the readings obtained from the sensor 232 reflects that the parcel is not above the maximum weight threshold or below the minimum weight threshold, the controller 52 will communicate instructions which cause the place conveyor 220 to be driven in the forward direction for a predetermined time, so that the parcel is directed to the downstream conveyor 222 after being deposited on the place conveyor 220.

Referring still to FIGS. 2 and 4, in this exemplary embodiment, each parcel received on the downstream conveyor 222 is subject to an additional weight assessment by the vision and control subsystem 50. In this regard, once a parcel is received on the proximal end of the downstream conveyor 222, the scale 223 weighs the parcel, and subsequently transmits weight data corresponding to the weight of the parcel to the controller 52 for further processing. If the weight data received from the scale 223 indicates that the parcel either exceeds the maximum weight threshold or falls below the minimum weight threshold, the controller 52 communicates instructions which cause the downstream conveyor 222 to be driven in a rearward direction for a predetermined time, so that the parcel is offloaded back onto the place conveyor 220. At or shortly after this time, the controller 52 also communicates instructions which cause the place conveyor 220 to be driven in a rearward direction for a predetermined time until the parcel is directed into the second rejection member 242. Once a parcel exceeding the maximum weight threshold or falling below the minimum weight threshold is offloaded from the place conveyor 220 to the second rejection member 242, another parcel can be delivered to the place conveyor 220 by the robot 230. If, however, the weight data received from the scale 223 indicates that the parcel does not exceed the maximum weight threshold or fall below the minimum weight threshold, the controller 52 communicates instructions which cause the downstream conveyor 222 to be driven in a forward direction for a predetermined period or until a new parcel is offloaded onto the downstream conveyor 222 by the place conveyor 220, so that the parcel is directed toward a distal end of the downstream conveyor 222. In some implementations, the vision and control subsystem 50 may determine that a new parcel has been offloaded onto the downstream conveyor 222 based on the passage of predetermined period of time following a determination by the controller 52 that such parcel is not unconveyable based on the readings obtained from the sensors 232 of the robot 230 and should be offloaded from the place conveyor 220 to the downstream conveyor 222. The above-described routine can be repeated until all parcels within the system 200 are processed.

Although the redundancy provided by the initial weight assessment based on the readings obtained from the sensor 232 of the robot 230 and the subsequent weight assessment based on the weight data from the scale 223 of the downstream conveyor 222 may be preferred, alternative embodiments and implementations in which only one of the two weight assessments is performed are also contemplated herein. For instance, in one embodiment and implementation, the secondary assessment of parcels transferred to the place area 221 of the place conveyor 220 may be based on the readings obtained by the sensor 232 of the robot 230 alone. In such an embodiment and implementation, subsequent to a parcel being offloaded onto the downstream conveyor 222 from the place conveyor 220, the downstream conveyor 222 can be a continuously-driven, single-direction conveyor, so that a parcel offloaded from the place conveyor 220 is immediately advanced toward the distal end of the downstream conveyor 222 without delay.

Furthermore, embodiments and implementations are also contemplated herein in which the secondary assessment of parcels transferred to the place area 221 of the place conveyor 220 is, like the initial assessment of such parcels (i.e., the assessment conducted by the vision and control subsystem 50 prior to a parcel being transferred from the pick area 211 of the pick conveyor 210 to the place area 221 of the place conveyor 220), additionally or alternatively based on the exhibited dimensions of such parcels reflected in the image data received from the vision unit 60. For instance, during the initial assessment, the controller 52 assesses the image data to determine whether each parcel in the pick area 211 exhibits one or more dimensional characteristics from a first list of predefined dimensional characteristics which signify that the parcel is unconveyable and should be directed to the first rejection member 240 instead of being transferred to the place conveyor 220 by the robot 230. For those parcels not determined to be unconveyable during the initial assessment and transferred to the place conveyor 220, the controller 52 then further assesses the image data to determine whether each parcel transferred to the place conveyor 220 exhibits one or more dimensional characteristics from a second list of predetermined dimensional characteristics which signify that the parcel is unconveyable and should be directed to the second rejection member 242.

As should be evident from the discussion above, the use of the second rejection member 242 and secondary assessment of parcels transferred to the place conveyor 220 can thus aid in the sortation, separation, and categorization of individual parcels within a bulk flow of parcels initially loaded onto the pick conveyor 210.

Figure 3:
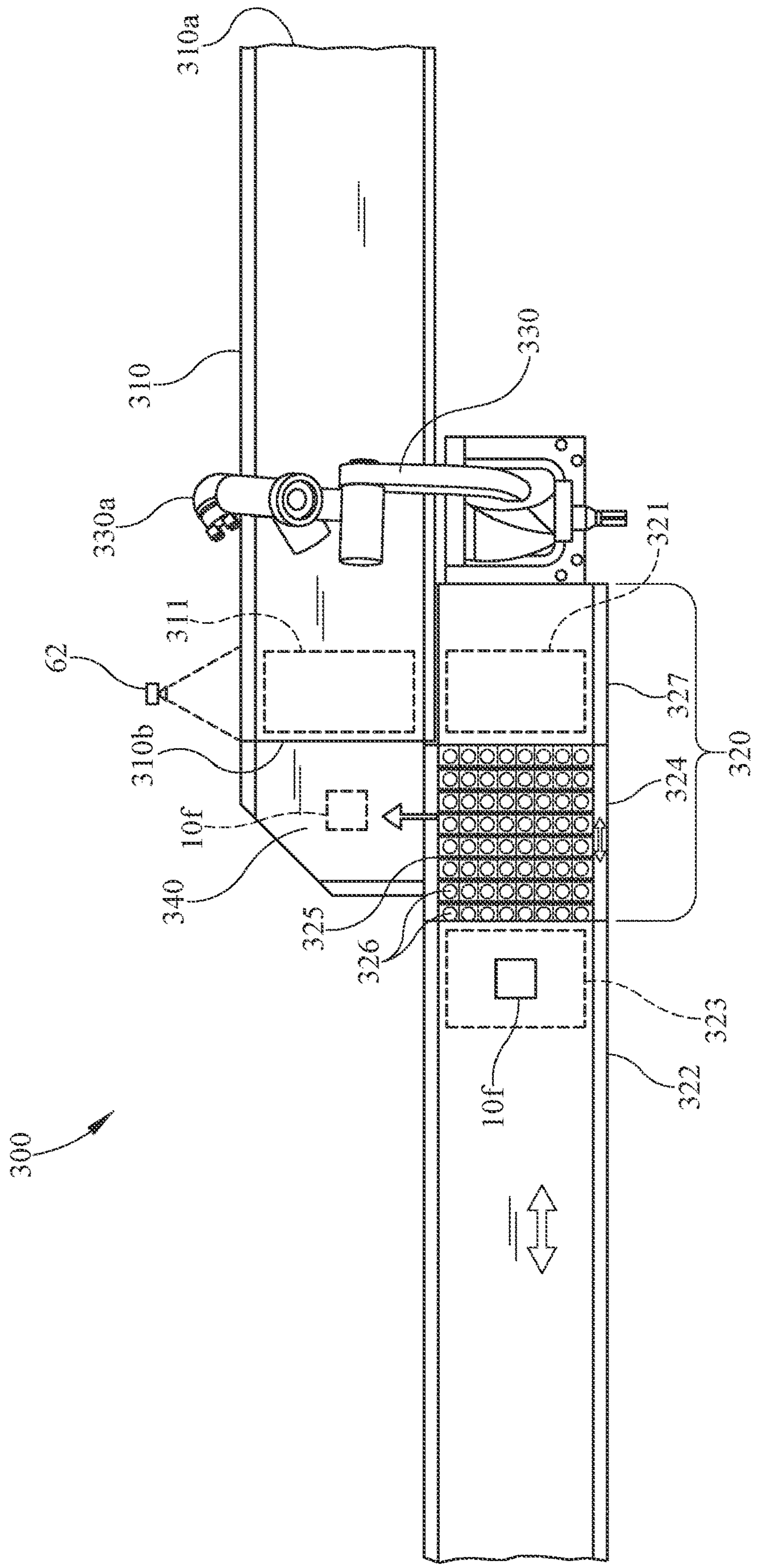
FIG. 3 is a schematic view of another exemplary system for handling parcels made in accordance with the present invention.

FIG. 3 is a schematic view of another exemplary system 300 for transferring parcels made in accordance with the present invention. In FIG. 3, parcel 10*f* illustrated in solid lines represents such parcel at a first time, and parcel 10*f* illustrated in broken lines represents such parcel at a second (later) time.

Referring now to FIGS. 3 and 4, in this exemplary embodiment, the system 300 includes a pick conveyor 310, a robot 330, and a rejection member 340 that are identical to the pick conveyor 110, the robot 130, and the rejection member 140 of the system 100 described above with reference to FIG. 1. The system 300 also includes a downstream conveyor 322 identical to that of the system 200 described above with reference to FIG. 2. Unlike the systems 100, 200 described above with reference to FIGS. 1 and 2, however, in this exemplary embodiment, the place conveyor 320 actually includes two separate conveyors: a landing conveyor 327 which defines a place area 321 where parcels transferred by the robot 330 from the pick conveyor 310 are deposited; and a multi-directional conveyor 324. The multi-directional conveyor is configured to: (i) convey parcels in a forward direction along the longitudinal axis of the place conveyor 320 toward the downstream conveyor 322; (ii) convey parcels in a rearward direction along the longitudinal axis of the place conveyor 320 toward the landing conveyor 327; and (iii) selectively convey parcels in a transverse direction to the longitudinal axis of the place conveyor 320, the importance of which is further described below. The respective conveyors of the place conveyor 320 may also be characterized as "modules" of the place conveyor 320.

Referring still to FIGS. 3 and 4, the landing conveyor 327 is positioned adjacent to the pick conveyor 310. Specifically, the landing conveyor 327 is positioned in side-by-side relationship with the pick conveyor 310, such that the landing conveyor 327 abuts the pick conveyor 310 to limit the movement required of the robot 330 as it transfers parcels from the pick area 311 of the pick conveyor 310 to a place area 321 of the landing conveyor 327 and improve the overall throughput of the system 300 in the same manner as systems 100, 200 described above with reference to FIGS. 1 and 2. In this exemplary embodiment, the landing conveyor 327 is operably connected to the vision and control subsystem 50, such that the controller 52 can communicate instructions to selectively index the landing conveyor 327 to advance parcels loaded thereon toward the multi-directional conveyor 324. In this exemplary embodiment, the landing conveyor 327 is a motor-driven continuous belt conveyor. Of course, motorized conveyors of different types and construction suitable for carrying out the operations of the landing conveyor 327 may alternatively be utilized without departing from the spirit and scope of the present invention.

Referring still to FIGS. 3 and 4, in this exemplary embodiment, the multi-directional conveyor 324 is an activated roller belt including a belt 325 and rollers 326 (which can also be in the form of or characterized as balls) integrated within the belt 325. The belt 325 is configured to be driven in either: a forward direction to advance parcels loaded onto the multi-directional conveyor 324 along a longitudinal axis of the place conveyor 320 and toward the downstream conveyor 222; or a rearward direction to move parcels loaded onto the multi-directional conveyor 324 back toward the landing conveyor 327. The rollers 326 can be selectively activated while a parcel is on the multi-directional conveyor 324 to offload the parcel from the multi-directional conveyor 324 in a direction which is transverse to the longitudinal direction of the place conveyor 320. In this exemplary embodiment, the multi-directional conveyor 324 is positioned adjacent to and abutting the rejection member 340, such that parcels offloaded from the multi-directional conveyor 324 in the transverse direction are directed onto the rejection member 340. Accordingly, as with the system 200 of FIG. 2, in this exemplary embodiment, parcels which are successfully engaged and transferred by the robot 330 can still be directed out of the system 300 for subsequent processing if determined by the vision and control subsystem 50 to be unconveyable. However, unlike the system 200 of FIG. 2, in this exemplary embodiment, parcels which are transferred to the place conveyor 320 by the robot 330 but are still nonetheless identified as being unconveyable are directed out of the system 300 by the same rejection member 340 as used to direct the unconveyable parcels which are not engaged and transferred by the robot 330 out of the system 300. Accordingly, in this exemplary embodiment, the rejection member 340 can thus be utilized to direct parcels identified as unconveyable both before and after being transferred by the robot 330 to a common destination downstream of the rejection member 340. The use of a single rejection member 340 to receive unconveyable parcels both before and after being transferred by the robot 330 is also advantageous in that it can reduce the spatial footprint of the overall system 300 as compared to systems employing the use of two separate rejection members, such as the system 200 described above with reference to FIG. 2. The multi-directional conveyor 324 is operably connected to the vision and control subsystem 50, such that the controller 52 can communicate instructions to selectively index the belt 325 and activate the rollers 326 of the multi-directional conveyor 324.

Referring still to FIGS. 3 and 4, when the system 300 is in use, parcels on the pick conveyor 310 are initially processed in the same manner as described above for the system 100 described above with reference to FIG. 1. That is, parcels which are not identified as unconveyable based on the image data received by the controller 52 from the camera 62 are engaged and transferred by the robot 330 to the place area 321 of the place conveyor 320, which, in this case, is defined by the landing conveyor 327, while parcels identified as unconveyable are directed to the rejection member 340, so that such parcels can be directed out of the system 200 via the rejection member 340 for subsequent processing. Like with the system 200 described above with reference to FIG. 2, in this exemplary implementation, the vision and control subsystem 50 also conducts a secondary assessment of each parcel transferred to the place conveyor 320 to determine whether the parcel should be identified as unconveyable and directed to the rejection member 340, so that the parcel can be directed out of the system 300 for subsequent processing. In this exemplary implementation, such secondary assessment is based on the weight. In this regard, the weight of each parcel transferred to the place area 321 of the place conveyor 320 is assessed to determine whether the weight of the parcel exceeds a predefined maximum threshold and/or falls below a predefined minimum threshold. Those parcels with weights which exceed the maximum threshold or fall below the minimum threshold are identified by the controller 52 as unconveyable.

Referring still to FIGS. 3 and 4, as a parcel is transferred to the landing conveyor 327 by the robot 330, the readings obtained by the sensor 332 of the robot 330 are processed by the controller 52 to determine whether the parcel should be identified as unconveyable and directed to the rejection member 340 subsequent to being deposited in the place area 321. Irrespective of the readings obtained by the sensor 332, however, the controller 52 communicates instructions which cause the both the landing conveyor 327 and the belt 325 of the multi-directional conveyor 324 to be indexed, so that the parcel is conveyed downstream subsequent to being deposited in the place area 321. If the readings obtained from the sensor 332 reflects that the parcel is above the maximum weight threshold or below the minimum weight threshold, the controller 52 also communicates instructions which cause the rollers 326 of the multi-directional conveyor 324 to be activated subsequent to the parcel being offloaded onto the multi-directional conveyor 324, which causes the parcel to be offloaded from the side of the multi-directional conveyor 324 onto the rejection member 340. Once a parcel exceeding the maximum weight threshold or falling below the minimum weight threshold is offloaded from the multi-directional conveyor 324 onto the rejection member 340, another parcel transferred by the robot 330 can be delivered to the multi-directional conveyor 324 by the landing conveyor 327. Conversely, if the readings obtained from the sensor 332 reflects that the parcel is not above the maximum weight threshold or below the minimum weight threshold, the controller 52 will not communicate instructions which cause the rollers 326 of the multi-directional conveyor 324 to be activated, so that the parcel is conveyed by the multi-directional conveyor 324 to the downstream conveyor 222.

Referring still to FIGS. 3 and 4, in this exemplary embodiment, each parcel received on the downstream conveyor 322 is subject to an additional weight assessment. In this regard, once a parcel is received on the proximal end of the downstream conveyor 322, the scale 323 weighs the parcel and communicates weight data corresponding to the weight of the parcel to the controller 52 for further processing. If the weight data received from the scale 323 indicates that the parcel either exceeds the maximum weight threshold or falls below the minimum weight threshold, the controller 52 communicates instructions which cause the downstream conveyor 322 to be indexed in a rearward direction for a predetermined period of time, so that the parcel is directed back onto the multi-directional conveyor 324. At or shortly after this time, the controller 52 also communicates instructions which cause: the belt 325 of the multi-directional conveyor 324 to index the parcel in a rearward direction toward the landing conveyor 327 for a predetermined period of time; and the rollers 326 of the multi-directional conveyor 324 to be activated to offload the parcel onto the rejection member 340, as evidenced by parcel **10*f* in FIG. 3. After the parcel is offloaded from the multi-directional conveyor 324 onto the rejection member 340, the controller 52 may communicate instructions which deactivates the belt 325 and the rollers 326 of the multi-directional conveyor 324, so that another parcel transferred by the robot 130 can be processed. If, however, the weight data received from the scale 323 indicates that the parcel does not exceed the maximum weight threshold or falls below the minimum weight threshold, the controller 52 communicates instructions which cause the downstream conveyor 322 to be driven in a forward direction for a predetermined time or until a new parcel is offloaded onto the downstream conveyor 322 by the multi-directional conveyor 324. The above-described routine can be repeated until all parcels within the system 300** are processed.

Although the redundancy provided by the initial weight assessment based on the readings obtained from the sensor 332 of the robot 330 and the subsequent weight assessment based on the weight data from the scale 323 of the downstream conveyor 322 may be preferred, alternative embodiments and implementations in which only one of the two weight assessments is performed are also contemplated herein. For instance, in one embodiment and implementation, the secondary assessment of parcels transferred to the place area 321 of the place conveyor 320 may be based on the readings obtained by the sensor 332 of the robot 330 alone. In such an embodiment and implementation, subsequent to a parcel being offloaded onto the downstream conveyor 322 from the multi-directional conveyor 324, the downstream conveyor 322 can be a continuously-driven, single-direction conveyor, so that a parcel offloaded from the multi-directional conveyor 324 onto the downstream conveyor 322 is immediately advanced toward the distal end of the downstream conveyor 322 without delay.

Furthermore, embodiments and implementations, are also contemplated herein in which the secondary assessment of parcels transferred to the place area 321 of the place conveyor 320 is, like the initial assessment of such parcels (i.e., the assessment conducted by the vision and control subsystem 50 prior to a parcel being transferred from the pick area 311 of the pick conveyor 310 to the place area 321 of the place conveyor 320), additionally or alternatively based on the exhibited dimensions of such parcels embodied in the image data received from the vision unit 60. For instance, during the initial assessment the controller 52 assesses the image data to determine whether each parcel in the pick area 311 exhibits one or more dimensional characteristics from a first list of predefined dimensional characteristics which signify that the parcel is unconveyable and should be directed to the rejection member 340 instead of being transferred to the place conveyor 320 by the robot 330. For those parcels not determined to be unconveyable during the initial assessment and transferred to the place conveyor 320, the controller 52 further assesses the image data to determine whether each parcel transferred to the place conveyor 320 exhibits one or more dimensional characteristics from a second list of predetermined dimensional characteristics which signify that the parcel is unconveyable and should be directed to the rejection member 340.

It is appreciated that each operation performed by the exemplary systems 100, 200, 300 described herein can also be characterized as a method step, unless otherwise specified. Accordingly, the present invention is also directed to a method for transferring parcels, in which some or all of the various operations described above and performed by the exemplary systems 100, 200, 300 correspond to a step within the method.

One of ordinary skill in the art will recognize that additional embodiments and implementations are also possible without departing from the teachings of the present invention. This detailed description, and particularly the specific details of the exemplary embodiments and implementations disclosed herein, are given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for transferring parcels, comprising:

a first conveyor for carrying a bulk flow of parcels:

a second conveyor positioned adjacent to the first conveyor;

a robot positioned adjacent to the first conveyor and the second conveyor, with the robot configured to engage and transfer select parcels in the bulk flow of parcels from the first conveyor to the second conveyor; and a rejection member for directing select parcels out of the system, with the rejection member positioned relative to the first conveyor and the second conveyor, such that parcels offloaded from at least one of the first conveyor and the second conveyor by operation of the at least one of the first conveyor and the second conveyor are received by the rejection member.

2. The system as recited in claim 1, and further comprising:

a vision and control subsystem, including a camera for acquiring image data of the bulk flow of parcels, and a controller operably connected to the robot and the camera, the controller including a processor for executing instructions stored in a memory component to (i) receive and process the image data from the camera to identify individual parcels in the bulk flow of parcels on the first conveyor and (ii) selectively communicate instructions which cause the robot to engage and transfer the select parcels in the bulk flow of parcels on the first conveyor to the second conveyor.

3. The system as recited in claim 1, wherein the rejection member is a chute defining at least one of (a) an inclined plane along which parcels offloaded to the rejection member can slide, and (b) an opening through which parcels offloaded to the rejection member can fall through.

4. The system as recited in claim 1, wherein the rejection member is positioned adjacent to a distal end of the first conveyor, such that parcels of the bulk flow of parcels offloaded from the distal end of the first conveyor are received by the rejection member.

5. The system as recited in claim 4, wherein the second conveyor is a bidirectional conveyor; and wherein the system further comprises a second rejection member for directing select parcels out of the system, with the second rejection member positioned adjacent to a proximal end of the second conveyor, such that parcels of the select parcels transferred to the second conveyor and offloaded from the proximal end of the second conveyor are received by the second rejection member.

6. The system as recited in claim 1, wherein the second conveyor includes a module configured to (a) convey the select parcels transferred to the second conveyor along a longitudinal axis of the second conveyor, and (b) to be selectively activated to convey the select parcels transferred to the second conveyor in a transverse direction relative to the longitudinal axis of the second conveyor; and wherein the rejection member is positioned adjacent to the module, such that parcels of the select parcels transferred to the second conveyor and offloaded from the second conveyor in the transverse direction are received by the rejection member.

7. The system as recited in claim 6, wherein the rejection member is positioned adjacent to a distal end of the first conveyor, such that parcels of the bulk flow of parcels offloaded from the distal end of the first conveyor are received by the rejection member.

8. The system as recited in claim 6, and further comprising:

a third conveyor positioned adjacent to the module of the second conveyor, with the third conveyor configured to be selectively activated to convey parcels received from the second conveyor back to the module of the second conveyor.

9. The system as recited in claim 8, wherein the third conveyor includes a scale for weighing parcels.

10. A system for transferring parcels, comprising:

a first conveyor for carrying a bulk flow of parcels, the first conveyor configured to be selectively activated to drive the bulk flow of parcels toward a distal end of the first conveyor;

a second conveyor positioned adjacent to the first conveyor;

a robot positioned adjacent to the first conveyor and the second conveyor, with the robot configured to engage and transfer select parcels in the bulk flow of parcels from the first conveyor to the second conveyor;

a rejection member for directing select parcels out of the system, with the rejection member positioned relative to the first conveyor and the second conveyor, such that parcels driven off of at least one of the first conveyor and the second conveyor by operation of the at least one of the first conveyor and the second conveyor are received by the rejection member; and a vision and control subsystem, including a camera for acquiring image data of the flow of parcels, and a controller operably connected to the robot and the camera, the controller including a processor for executing instructions stored in a memory component to (i) receive and process the image data from the camera to identify individual parcels in the bulk flow of parcels on the first conveyor, and (ii) selectively communicate instructions which cause the robot to engage and transfer the select parcels in the bulk flow of parcels on the first conveyor to the second conveyor.

11. The system as recited in claim 10, wherein the rejection member is a chute defining at least one of (a) an inclined plane along which parcels offloaded to the rejection member can slide, and (b) an opening through which parcels offloaded to the rejection member can fall through.

12. The system as recited in claim 10, wherein the rejection member is positioned adjacent to the distal end of the first conveyor, such that parcels of the bulk flow of parcels offloaded from the distal end of the first conveyor are received by the rejection member.

13. The system as recited claim 12, wherein the second conveyor is a bidirectional conveyor; and wherein the system further comprises a second rejection member positioned adjacent to a proximal end of the second conveyor, such that parcels of the select parcels transferred to the second conveyor and driven off of the proximal end of the second conveyor are received by the second rejection member.

14. The system as recited in claim 13, wherein the controller is further operably connected to the second conveyor; and wherein the memory component further includes instructions, which, when executed by the processor, cause the controller to (iii) communicate instructions to selectively activate the second conveyor to drive one or more parcels of the select parcels transferred to the second conveyor off of the proximal end of the second conveyor.

15. The system as recited in claim 12, wherein the controller is further operably connected to the first conveyor; and wherein the memory component further includes instructions, which, when executed by the processor, cause the controller to (iii) selectively communicate instructions which selectively activate the first conveyor to drive one or more parcels of the bulk flow of parcels off of the distal end of the first conveyor.

16. The system as recited in claim 15, wherein the second conveyor includes a module configured (a) to convey the select parcels transferred to the second conveyor along a longitudinal axis of the second conveyor and (b) to be selectively activated to convey the select parcels transferred to the second conveyor in a transverse direction relative to the longitudinal axis of the second conveyor; and wherein the rejection member is positioned adjacent to the module, such that parcels of the select parcels transferred to the second conveyor and driven off of the second conveyor in the transverse direction are received by the rejection member.

17. The system as recited in claim 16, and further comprising:

a third conveyor positioned adjacent to the module of the second conveyor, with the third conveyor configured to be selectively activated to convey parcels received from the second conveyor back to the module of the second conveyor.

18. The system as recited in claim 17, wherein the third conveyor includes a scale for weighing parcels, which is operably connected to the controller.

19. The system as recited in claim 18, wherein the controller is further operably connected to the second conveyor and the third conveyor; and wherein the memory component further includes instructions, which, when executed by the processor, cause the controller to (iv) receive and process weight data corresponding to a weight of an individual parcel on the scale, (v) communicate instructions to activate the third conveyor to convey the individual parcel to the module of the second conveyor in response to the weight of the individual parcel exceeding a predetermined weight threshold, and (vi) communicate instructions to activate the module of the second conveyor to convey the individual parcel in the transverse direction.

* * * * *